March 1, 1966     G. I. BOYCE ETAL     3,237,510
AIR FILTER INSPECTION MEANS UTILIZING A VEHICLE HEADLIGHT
Filed Dec. 13, 1961
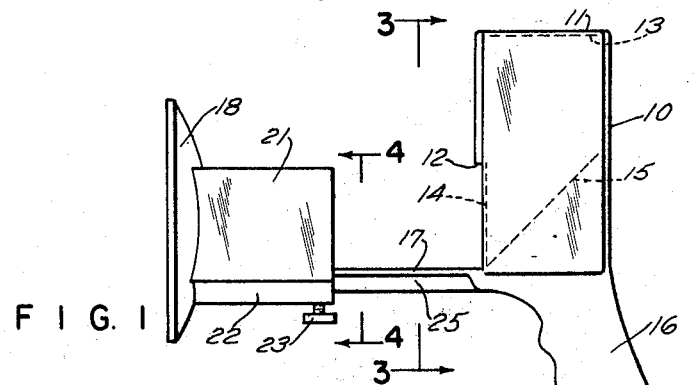
FIG. 1
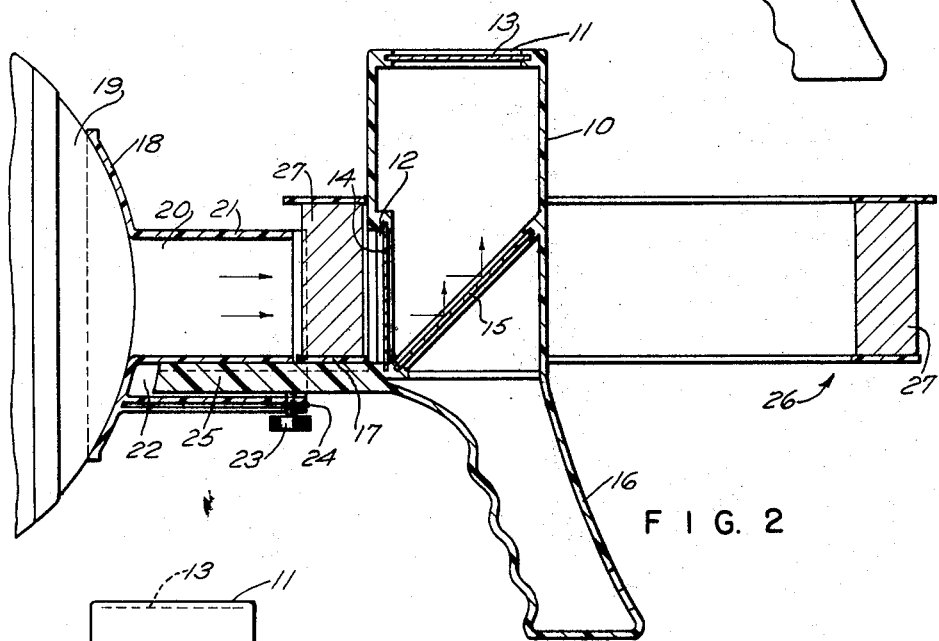
FIG. 2
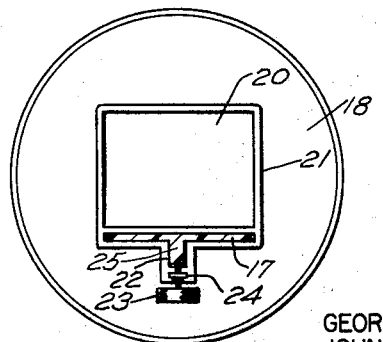
FIG. 3     FIG. 4
INVENTORS
GEORGE I. BOYCE
JOHN A. WIEGAND
BY Charles C. Willson
ATTORNEY United States Patent Office 3,237,510
Patented Mar. 1, 1966

3,237,510
AIR FILTER INSPECTION MEANS UTILIZING A VEHICLE HEADLIGHT
George I. Boyce, Lincoln, and John A. Wiegand, Barrington, R.I., assignors to Fram Corporation, Providence, R.I., a corporation of Rhode Island
Filed Dec. 13, 1961, Ser. No. 159,072
1 Claim. (Cl. 88—14)

This invention relates to light means for inspecting the dirt contents of filters, and more particularly to means for employing the light beam of the headlight of a motor vehicle to inspect an air filter for the engine of such motor vehicle.

The idea of utilizing a light to inspect the dirt contents of annular air filters such as are now extensively used to filter the air supplied to the carburetor of an internal combustion engine is not new with applicants. An inspection device for this purpose is disclosed in U.S. Design Patent No. 186,090. In accordance with the disclosure of such patent, an electric light bulb is placed inside of a ring-shaped air filter to determine how much light can be seen through the filter material. In such patent a conductor cord is shown for supplying electric current to the inspection light.

In contrast with the disclosure of such patent, the present invention contemplates the use of the beam of a headlight from a motor vehicle to inspect a filter. For best results the area of the filter being inspected should be shielded from sunlight during the inspection procedure.

Having in mind the foregoing, the preferred embodiment of the present invention resides in a light shielding box provided with an inspection opening or window at its upper end and in a side wall. Within this box is placed a mirror disposed between the two openings at an angle of approximately 45 degrees to each, so that light rays entering through the side opening can be seen by a person looking down through the top opening.

This box forms part of a frame having a laterally extending bar which serves to support a headlight cover in spaced relation to the box. This cover is curved to fit the contour of a vehicle headlight and has a central opening. The arrangement is such that when the filter inspecting means just described is held with its cover against a lighted vehicle headlight, the beam from the light can be seen by a person looking into the upper opening of the light shielding box. Now if a ring-shaped filter to be inspected is placed so that an area of the filter lies across said beam between the box and cover, it can be inspected by a person looking into said upper opening.

The device of the present invention preferably has a handle of the pistol-grip type for supporting the headlight cover against an illuminated headlight, and this cover is preferably mounted for adjustment toward and from the light shielding box to vary the size of the filter-receiving space therebetween.

The above and other features of the invention will be further understood from the following description when read in connection with the accompanying drawing; wherein, FIG. 1 is a side view of the inspecting device of the present invention.

FIG. 2 is a vertical longitudinal sectional view of the device of FIG. 1 with an annular filter shown in section in the inspection position.

FIG. 3 is a sectional view taken on the line 3—3 of FIG. 1; and

FIG. 4 is a sectional view taken on the line 4—4 of FIG. 1.

Referring to the drawing and more particularly to FIG. 1 thereof, there is shown a light shielding box 10 extending in an upright position. This box has an open upper end or window 11 and an opening or window 12 in a side wall. The opening 11 is preferably closed with a transparent plastic sheet 13 to keep dust out of the box 10, and the opening 12 is preferably closed with a similar transparent sheet 14.

Within the box 10 is mounted a mirror 15 which may be formed of a sheet of polished stainless steel, and this mirror is supported between the windows 11 and 12 at an angle of approximately 45 degrees to each. The arrangement is such that light entering the side window 12 can be seen by a person looking down into the box 10 through the end window 11.

The box 10 as shown is part of a frame comprising a downwardly extending handle 16 of the pistol-grip type, and a laterally projecting bar 17 adapted to slidably support a headlight cover 18.

The cover 18 resembles a concave disc adapted to fit the curved glass face of a motor vehicle headlight 19, and this cover has a central opening 20 through which the beam from the headlight can be seen. The concave cover 18 is supported by a hollow box portion 21 that serves to shield sunlight from the beam just mentioned, and the lower wall portion of this box is provided with a slot or slide-way 22 adapted to slidingly receive a portion of the latterally projecting bar 17. The arrangement is such that a headlight cover 18 may be adjusted towards and from the light shielding box 10, and can be clamped in the desired position of adjustment by tightening the thumb screw 23. This thumb screw threadedly engages a nut 24 that is retained in a slot in the lower wall of the box 21, and the end of this screw clampingly engages the central rib portion 25 of the bar 17.

Having described the inspection device of the present invention the preferred way of using the same to inspect an annular air filter cartridge such as indicated by 26 in FIG. 2 of the drawing will now be described. The cartridge 26 has the ring construction shown and is preferably formed of pleated paper 27 having the pleats extending in the axial direction.

This inspection device makes it possible to quickly and easily inspect a filter, such as indicated by 26, to determine whether or not it is seriously plugged with dirt, or whether any holes have developed in the pleated filter paper 27. To inspect such filter all that is necessary is to turn on the motor vehicle headlights, then grasp the handle 16 of the inspection device in the left hand and hold the device with its cover 18 resting against a headlight, as shown in FIG. 2. The ring filter 26 is then placed as shown in FIG. 2 with a part of this ring disposed between the parts 10 and 21 as shown, while the lower face of the filter rests on the bar 17. While the parts are in this position the ring filter is slowly rotated with the right hand to bring successive filter pleats 27 in position to be inspected by the light beam supplied by the headlight 19. At this time the person holding the inspection device looks down through the window 11 to see by means of the mirror 15 how much light passes through the filter pleats, and thereby determines whether or not the air filter should be replaced. If the filter is relatively clean some light will pass through the pleats; but if the filter is plugged with dirt, no light will pass through the pleats.

The frame parts above described and cover parts 18, 21 may be formed of metal or other material but are preferably formed of molded plastic that will take a relatively rigid set. When made of a molded plastic the frame just mentioned is preferably formed of two longitudinally extending halves, each of which has the general appearance shown in FIG. 2. Each longitudinal half has the slotted portions shown to receive the transparent plastic sheets 13 and 14 and mirror 15. Then after such sheets and mirror are in place the two plastic halves are permanently bonded one to the other. The reason the cover parts 18, 21 are adjustably mounted upon the supporting bar 17 is to vary the space between these parts to accommodate different size ring filters.

Since the present inspecting device utilizes the beam of a vehicle headlight to inspect filters, it is less expensive to make and easier to use than a device that needs to supply its own light.

Having thus described our invention, what we claim and desire to protect by Letters Patent is:

Means for utilizing a headlight of a motor vehicle to inspect an air filter for dirt contents, comprising
- a portable frame, having a light-shielding box provided with a first light-receiving opening in a side wall and a second visual inspection opening in a top wall, said box having mounted therein,
- a mirror disposed at approximately 45 degrees to said openings so that a beam of light entering the first opening can be seen from the second opening,
- a headlight cover curved to fit the contour of a vehicle headlight and having a central light opening and supported by said frame in spaced relation to the box in alignment with said first opening, whereby when the inspection means is held in a horizontal position with said cover against a lighted headlight the beam from said headlight will pass through both said central light opening and first light-receiving opening to the mirror to be seen through said second visual inspection opening, and
- a laterally projecting bar on said frame adjacent said first light-receiving opening for supporting a filter between the light-shielding box and the headlight cover in a position where a part of the filter is disposed across the beam from said headlight, whereby an observer may look into said second visual inspection opening to determine how much light passes through such part of the filter.

References Cited by the Examiner
UNITED STATES PATENTS

| | | | |
|---|---|---|---|
| 587,254 | 7/1897 | Aglot | 88—14 |
| 1,802,007 | 4/1931 | Durfee | 88—14 |
| 2,985,749 | 5/1961 | Johnson. | |

JEWELL H. PEDERSEN, *Primary Examiner.*

T. L. HUDSON, *Assistant Examiner.*